United States Patent
Tom et al.

(10) Patent No.: US 6,369,918 B1
(45) Date of Patent: Apr. 9, 2002

(54) APPARATUS, METHOD, AND COMPUTER PROGRAM TO REDUCE DISTORTION OF SCANNER RESTARTS

(75) Inventors: Ronald Hou Kern Tom, San Jose; Frederick McGuire Hamilton, Sunnyvale, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/246,498

(22) Filed: Feb. 8, 1999

(51) Int. Cl.$^7$ ................................................ H04N 1/04
(52) U.S. Cl. ..................................... 358/486; 250/578.1
(58) Field of Search ................................ 358/486, 474, 358/447, 412, 410, 293; 250/578, 328

(56) References Cited

U.S. PATENT DOCUMENTS

| | | | |
|---|---|---|---|
| 4,314,281 A | 2/1982 | Wiggins et al. | 358/280 |
| 4,327,377 A | 4/1982 | Takken | 358/199 |
| 4,375,652 A | 3/1983 | White | 358/213 |
| 4,523,101 A | 6/1985 | Tsunekawa | 250/578 |
| 4,771,333 A | 9/1988 | Michaels | 358/213.29 |
| 4,782,840 A | 11/1988 | Martin, Jr. et al. | 414/4.49 |
| 4,839,741 A | 6/1989 | Wilson | 358/293 |
| 4,878,119 A | 10/1989 | Beikirch et al. | 358/471 |
| 5,028,887 A * | 7/1991 | Gilmore | 331/18 |
| 5,043,827 A | 8/1991 | Beikirch | 358/471 |
| 5,336,878 A | 8/1994 | Boyd et al. | 250/208.1 |
| 5,369,504 A | 11/1994 | Walker | 358/437 |
| 5,416,611 A | 5/1995 | Tandon | 358/474 |
| 5,473,445 A | 12/1995 | Takei et al. | 358/474 |
| 5,491,397 A | 2/1996 | Hirakawa | 318/696 |
| 5,519,514 A | 5/1996 | TeWinkle | 358/514 |
| 5,541,645 A | 7/1996 | Davis | 348/96 |
| 5,585,620 A | 12/1996 | Nakamura et al. | 250/208.1 |
| 5,627,367 A | 5/1997 | Sofield | 250/252.1 |
| 5,682,033 A | 10/1997 | Cattorini | 250/208.1 |
| 5,687,009 A | 11/1997 | Walsh et al. | 358/486 |
| 5,703,700 A | 12/1997 | Birgmeir et al. | 358/487 |
| 5,716,595 A | 2/1998 | Goldenberg | 128/654 |

FOREIGN PATENT DOCUMENTS

EP 0671848 * 9/1995 ............ H04N/5/12

OTHER PUBLICATIONS

U.S. Patent Application No. 09/166,871; filed Oct. 6, 1998 Inventor: Frederick McGuire Hamilton Invention title: "Apparatus, Method and Computer Program For Increasing Scanner Data Throughput".

* cited by examiner

Primary Examiner—Jerome Grant, II
Assistant Examiner—Negussie Worku
(74) Attorney, Agent, or Firm—Pillsbury Winthrop LLP

(57) ABSTRACT

An apparatus, method, and computer program for reducing distortion of a scanned image upon a resume after a pause by a scanner. A default phase difference is calculated by the computer program before the scan starts. The default phase difference is based on a phase relationship between a step signal, an integration signal, and a number of backward steps. The default phase difference is used to control the resumption with a relatively small number of circuit elements.

15 Claims, 8 Drawing Sheets

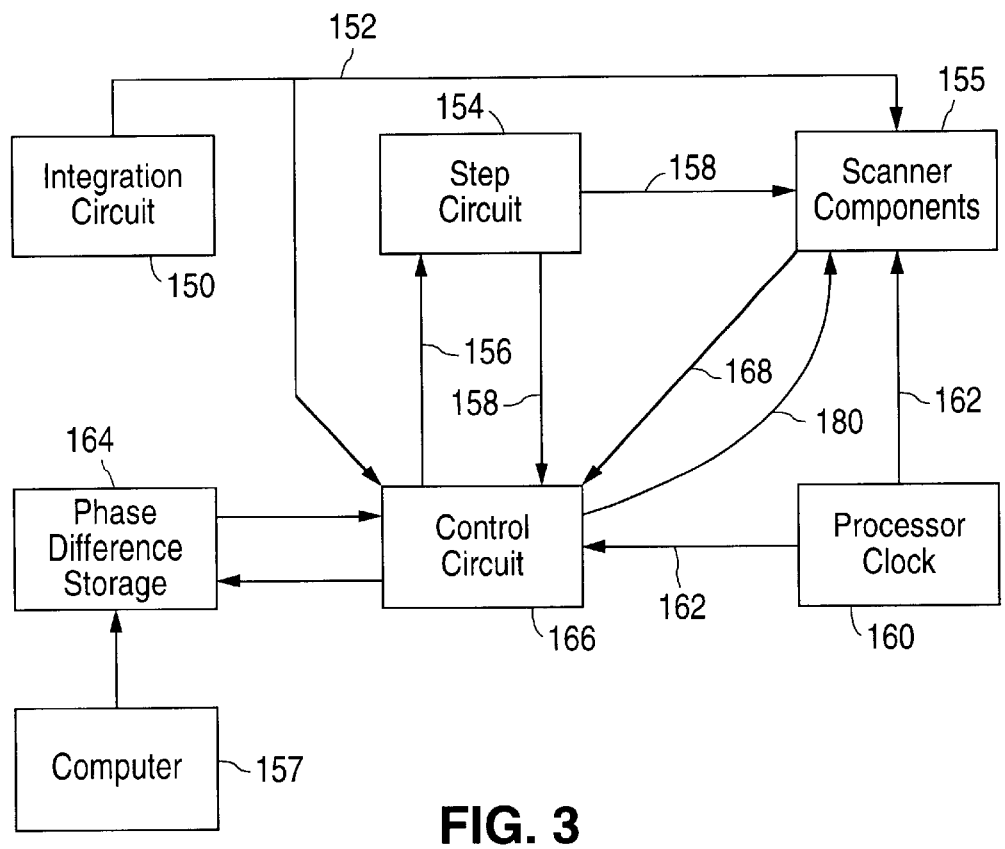
FIG. 3
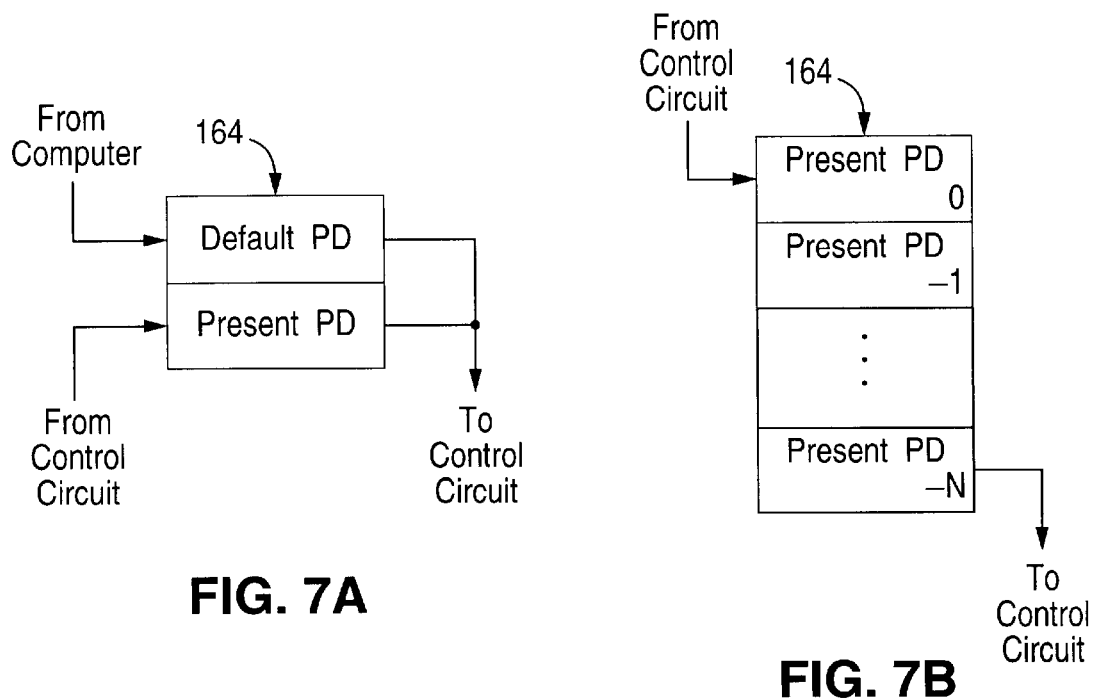
FIG. 7A
FIG. 7B

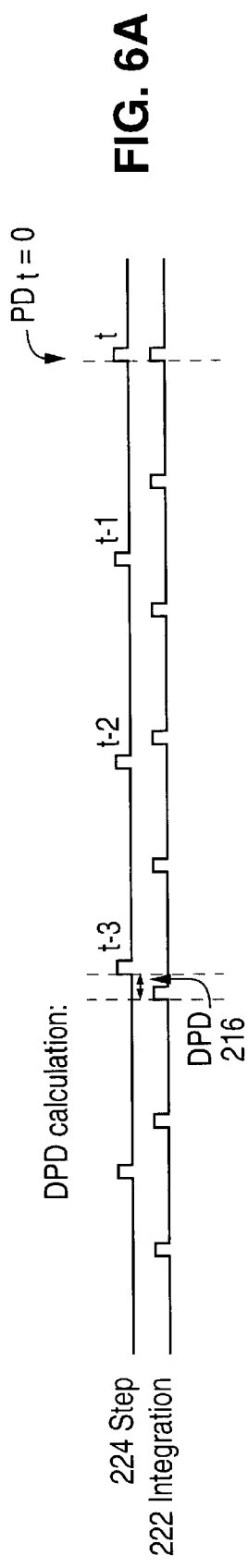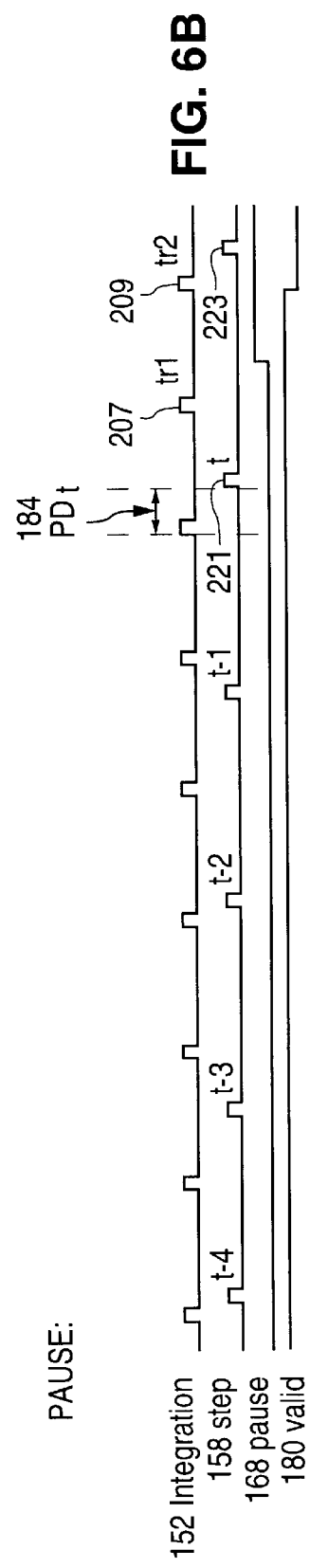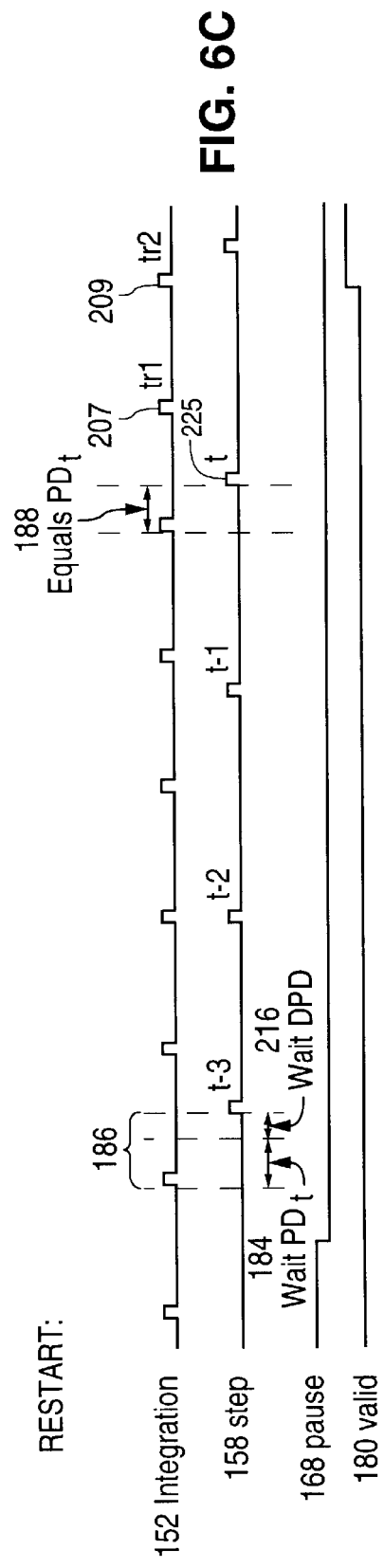

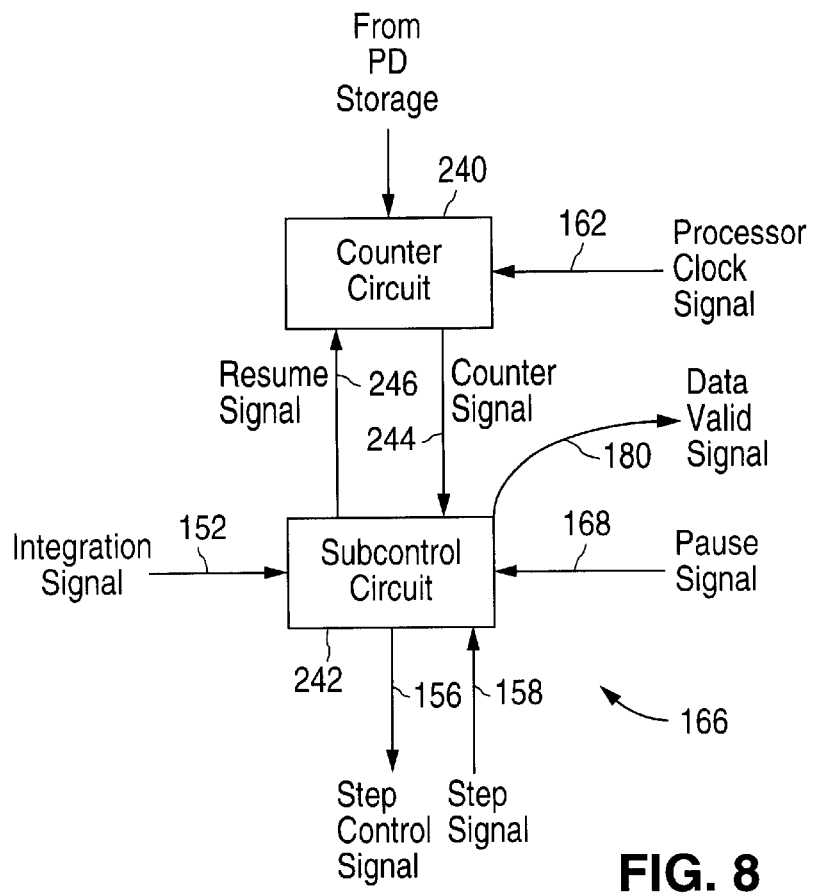
FIG. 8
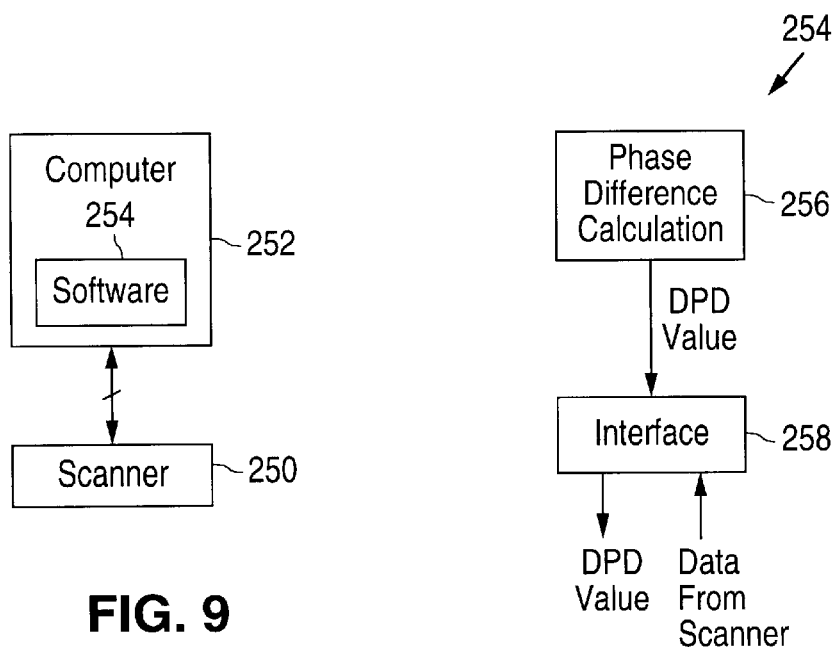
FIG. 9
FIG. 10

APPARATUS, METHOD, AND COMPUTER PROGRAM TO REDUCE DISTORTION OF SCANNER RESTARTS

BACKGROUND OF THE INVENTION

1. Field of the Invention

The present invention relates to scanners in which the integration period is not an integer multiple of the step period. In particular, the invention relates to timing a resume after a pause for scanners in which the integration period is not an integer multiple of the step period.

2. Description of the Related Art

Scanners generate data at a rate proportional to a processor clock signal. The duration of a scan is thus the amount of data to scan divided by the rate. The amount of data to scan is determined by the horizontal resolution, the horizontal size, the vertical resolution, and the vertical size. Scanners transfer the scanned data to an associated device (usually a computer) at a rate generally less than the processor clock speed. Thus, data accumulates at the scanner faster than it can be transferred. Many scanners include a buffer to hold the accumulated data.

Unfortunately, the accumulated data backlog is often greater than a desired size for the buffer. Such desired size is usually measured by cost, with a large enough buffer to hold the largest possible data accumulation being expensive and usually inefficient because often the largest possible data backlog will not be generated. A typical solution, instead, is to provide a moderately-sized buffer and then pause generation of the scanned data until the buffer has been emptied.

The amount of time the scanner takes to process one line of an image is called the integration period. An "integration signal" is a series of pulses spaced apart from one another by the integration period. A horizontal sensor in the scanner reads one line of the image. Data processing hardware in the scanner uses the integration signal to time its processing of the data from the sensor.

A stepper motor moves the sensor vertically down the image. (Some scanners move the image instead of the sensor, and some scanners move a vertical sensor horizontally, but the principles are the same.) A "step" is a unit of vertical movement. (Some scanners move the sensor in units of microsteps, but the principles are the same.) The amount of time the scanner takes to move one step is called the step period. A series of pulses spaced apart from one another by the step period is called the step signal. So, the step signal drives the stepper motor.

Many scanners have sensors that are physically configured to scan an image at 600 dots per inch (DPI) or an integer fraction thereof: 300, 200, 150, 120, 100, 85.71, and 75 DPI. (Other resolutions are generally made by scanning at the next higher resolution and then processing the line data in software to reduce it to the desired resolution.) Many scanners also prefer to scan at the same vertical resolution as horizontal resolution. In such a situation the scanner is set such that one step is 1/600th of an inch, and the scanner takes an integer number of steps per integration period.

FIG. 1 illustrates the movement of a sensor driven by a stepper motor that takes an integer number of steps per integration period. The x-axis shows time in processor clock periods, and the y-axis shows distance in lines. Line 32 shows the progress of the sensor as it moves over the lines. Integration signal 20 has a period equal to the time the scanner takes to process one line, so the pulses of integration signal 20 define the lines. Pulses of step signal 22 cause the sensor to move one step. The illustrated relationship between integration signal 20 and step signal 22 is such that the sensor moves one step per integration period, which for many scanners indicates the highest vertical and horizontal resolution of 600 DPI. Similarly, two pulses of step signal 22 per integration period would indicate that the sensor moves twice as far in one line, so each line would have a doubled vertical dimension and the scan would be at 300 DPI.

Region 28 is the area in which the sensor moves across lines of the image and detects the light levels thereof. In the middle of the sixth line, pause signal 24 goes high to indicate that the buffer is about to be full and the scanner should stop scanning. The scanner continues processing line six, although other scanners may be configured to stop processing immediately. If the scanner is scanning at more than one step per integration period then the stepper motor should continue stepping until the line has been completed, otherwise the partial data of the line may have to be discarded and the line re-scanned in its entirety upon resuming.

Upon de-assertion of the step signal 22 pulse, at the end of the sixth line, the data valid signal 26 goes low to indicate that the sensor has completed scanning line six, the last line to be scanned before the pause. Any light levels the sensor detects at this point should not be transferred into the buffer.

Ideally, the sensor would pause right at the start of line seven, because the pulses of step signal 22 could be paused at that point. However, the physical characteristics of the stepper motor and the sensor, such as the mass of the sensor and the finite torque of the stepper motor, result in nonideal conditions. These nonideal conditions may cause the sensor to continue moving into line seven, resulting in an inaccurate sensor position upon resuming. Similarly, nonidealities affect the resuming of sensor movement as well, causing the sensor to move with a nonuniform velocity when it is first restarted. This further increases distortion of the resulting scan.

Many scanners solve these problems by moving the sensor backward over previously-scanned lines during a pause. This solves the continued movement problem because the sensor can move backward enough to compensate for the continued forward movement. It solves the nonuniform velocity problem because the sensor can reach a constant velocity after accelerating over the previously-scanned lines.

As shown in FIG. 1, in region 30 the step signal 22 pulses three times after pause signal 24 goes low, moving the sensor backward three lines. Pulses of the integration signal 20 may continue, if desired, even though no valid data is being generated.

In region 34, no pulses of step signal 22 are generated as the scanner waits for the buffer to empty. Pulses of the integration signal 20 may continue, if desired. Near the end of region 34, the pause signal 24 changes to indicate that the buffer is no longer full and the scanner can resume moving and generating data.

In region 38, pulses of step signal 22 resume. These three pulses are to move the sensor forward again (over the reversed lines of region 30).

In region 40, after the three pulses of step signal 22 (in region 38), the data valid signal 26 goes high to indicate that the sensor is now at line seven, the correct line to resume generating data.

As detailed above, the scanner having the movement shown in FIG. 1 takes an integer number of steps (specifically, one step) per integration period. However, not all scanners take an integer number of steps per integration period, for example, as described in U.S. patent application Ser. No. 09/166,871 entitled "Apparatus, Method, and Computer Program for Increasing Scanner Data Throughput", assigned to the owner of the present application and incorporated herein by reference. A scanner that takes a non-integer number of steps per integration period will have resuming problems not solved by scanners such as those described above, as detailed in FIG. 2.

FIG. 2 illustrates the movement of a sensor driven by a stepper motor that takes a non-integer number of steps per integration period. The x-axis, y-axis, line 32, integration signal 20, pause signal 24, and data valid signal 26 are as described above regarding FIG. 1. Step signal 50 has a period slightly longer than that of integration signal 20; specifically, seven step pulses per eight integration pulses.

The first difference from FIG. 1 is that, in region 30, the sensor moves into line seven because the stepper motor does not generate reverse movement until the step pulse 52, which occurs after line six has been scanned.

The second difference from FIG. 1 is that region 34 is split into a new region 36 because of the non-integer relationship between integration signal 20 and step signal 50. In region 36, the step signal 50 must begin at a timing such that, when generation of valid data resumes in region 40 at integration pulse 54, the sensor is at the correct position to sense line seven. If the step signal 50 begins too soon, the sensor moves along line 56. When line 56 intersects with the timing of integration pulse 54, the sensor begins scanning too late and scans mostly line eight instead of line seven, effectively skipping line seven. If the step signal 50 begins too late, the sensor moves along line 58. When line 58 intersects with the timing of integration pulse 54, the sensor begins scanning too early and scans mostly line six instead of line seven, effectively duplicating line six. Such skipping and duplication can lead to a distorted scan. This distortion results whenever the timing of the resumption of the step signal varies from what it should be.

Thus, a way is needed to control resumption of generation of the step signal after a pause such that the effects of skipping and duplication can be reduced.

SUMMARY OF THE INVENTION

The present invention addresses these and other problems of existing scanners by providing an apparatus, method, and computer program for controlling a scanner to reduce distortion of a scanned image on a resume after a pause.

According to one embodiment, an apparatus according to the present invention has a circuit that reduces distortion by controlling a scanner configured to scan an image with a sensor by relative movement therebetween in units of steps. The circuit includes a phase difference storage circuit and a control circuit. The phase difference storage circuit is configured to store a phase difference value. The control circuit is coupled to the phase difference storage circuit and is configured to receive a pause signal, an integration signal, a processor clock signal, and the phase difference value, and in accordance therewith to generate a step control signal.

According to another embodiment, a method according to the present invention reduces distortion by controlling a scanner configured to scan an image with a sensor. The method includes the steps of monitoring an integration signal and a step signal, and calculating at least one phase difference value based on a phase difference between the integration signal and the step signal. The integration signal has an integration period in which a line of an image is scanned, and the step signal has a step period in which a step of relative movement between the image and the sensor is performed. The phase difference is a comparative characteristic between the step signal and the integration signal.

According to yet another embodiment, a computer program according to the present invention reduces distortion by controlling a scanner configured to scan an image with a sensor. The computer program includes a phase difference calculation subroutine configured to calculate a phase difference value based on a phase difference between an integration period in which a sensor scans a line of an image and a step period in which a step of relative movement between the image and the sensor is performed.

BRIEF DESCRIPTION OF THE DRAWINGS

FIG. 3 is a block diagram of an embodiment of the present invention.

FIGS. 6A, 6B, and 6C are timing diagrams of various phase relationships between an integration signal and a step signal.

FIGS. 7A and 7B are each a block diagram of a phase difference storage circuit according to an embodiment of the present invention.

FIG. 8 is a block diagram of a control circuit according to an embodiment of the present invention.

FIG. 9 is a block diagram of a scanning system according to an embodiment of the present invention.

FIG. 10 is a block diagram of a computer program according to an embodiment of the present invention.

DETAILED DESCRIPTION OF THE PREFERRED EMBODIMENTS

Figure 1:
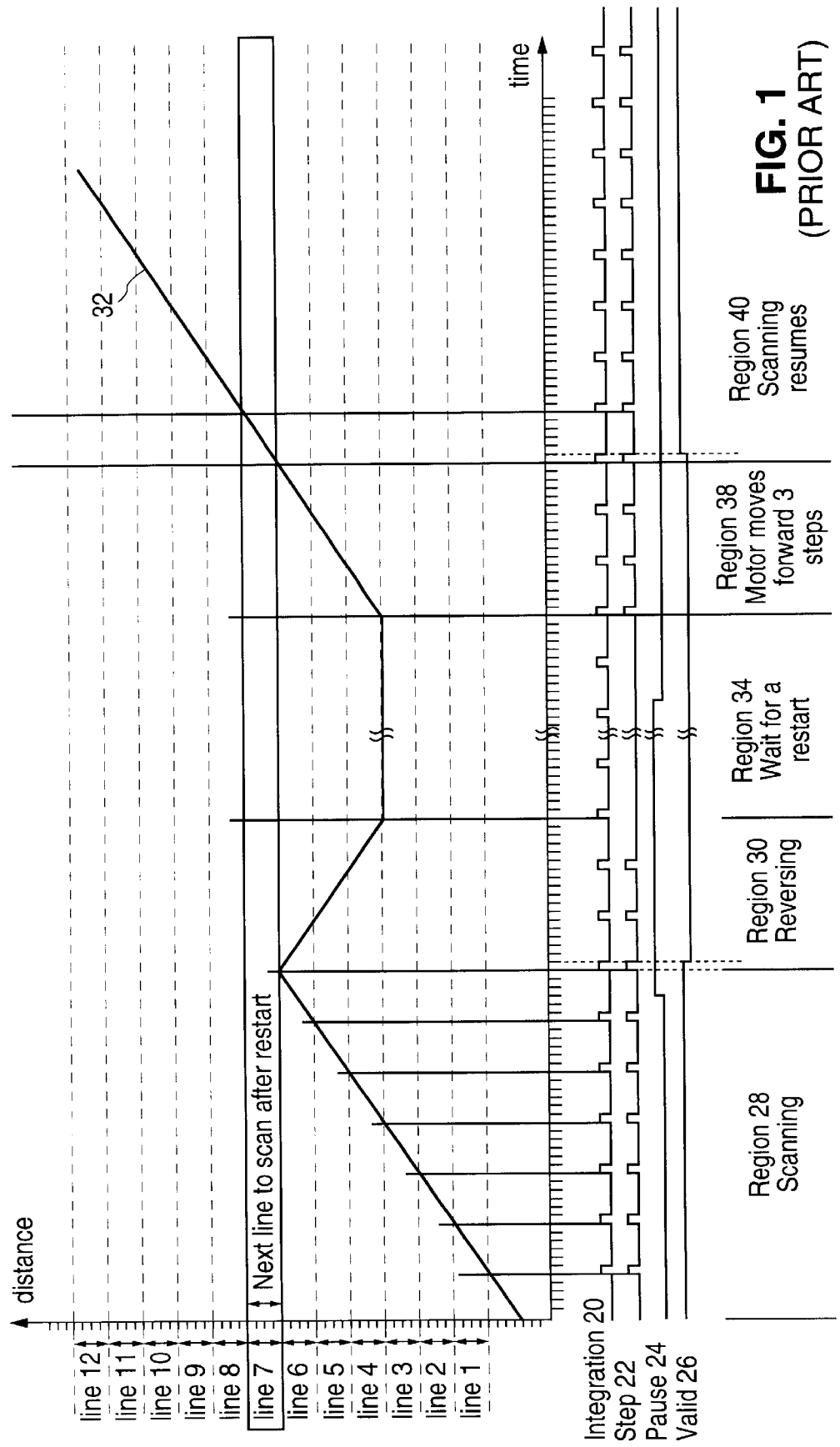
FIG. 1 is a graph of distance in lines scanned versus time by a sensor in a conventional scanner.

FIG. 3 is a block diagram of the general components of the present invention, including an integration clock signal generator circuit 150, a step clock signal generator 154, a processor clock signal generator circuit 160, a phase difference storage circuit 164, and a control circuit 166. The integration signal generator circuit 150 is configured to generate an integration signal 152. As with many existing scanners as described above, the integration signal 152 determines the amount of time spent processing one line of the image. The integration signal 152 may be provided to other scanner components 155 that use it to process the data in lines of the image.

The step clock signal generator circuit 154 is configured to receive a step control signal 156 and to generate a step signal 158. The step signal 158 determines when the stepper motor of the scanner moves a step. The stepper motor may move the sensor, or it may move the image. The step signal 158 may be generated in units of microsteps if desired. The step control signal 156 selectively controls generation of the step signal 158. The step signal 158 may also indicate whether the steps are to be in the forward direction or the backward direction (over lines previously scanned). The step signal 158 may be provided to the other scanner components 155 that use it to generate movement.

The processor clock signal generator circuit 160 is configured to generate a processor clock signal 162. The processor clock signal 162 controls the rate at which pixels of the image are processed. Thus, the number of pixels to be processed in a line times the period of the processor clock signal 162 equals the period of the integration signal 152. The frequency of the processor clock signal may be about 6 MHz, although other speeds may be used as desired. The processor clock signal 162 may be adjustable as disclosed in copending application Ser. No. 09/166,871 as referenced above. The processor clock signal 162 will generally be much faster than the integration signal 152 and the step signal 158, so these signals 152 and 158 may be generated as fractions of the processor clock signal 162. The processor clock signal 162 may be provided to other scanner components 155 that use it to control pixel processing.

Phase difference storage circuit 164 is configured to store a phase difference value. The phase difference value is the phase difference between the integration signal 152 and the step signal 158 at a specified time, as further described below. The phase difference value may be in units of the period of the processor clock signal 162. The phase difference value may be calculated by the control circuit 166, by an associated computer 157, or by a program in the associated computer 157. The phase difference value may be a table of phase difference values corresponding to a plurality of phase differences between the integration signal 152 and the step signal 158.

The control circuit 166 is configured to receive the integration signal 152, the step signal 158, the processor clock signal 162, the phase difference value, and a pause signal 168. Alternatively, if the control circuit 166 is configured to calculate the phase difference value, then the control circuit 166 is configured to receive the integration signal 152, the step signal 158, the processor clock signal 162, and the pause signal 168. The other scanner components 155 use the pause signal 168 to indicate that the scanner's buffer is full and the scanner should stop generating data so that the buffer may be unfilled. When the control circuit 166 receives the pause signal 168, the control circuit 166 indicates with step control signal 156 that the step signal generator circuit 154 should stop generating the step signal 158. The absence of the step signal 158 causes the sensor to remain in its present location so that when the step signal 158 is restarted the sensor may resume at the line on which it paused.

The control circuit 166 generates the data valid signal 180 for the scanner components 155. The data valid signal 180 indicates that the scanner should stop processing data because a pause has been signaled, and indicates that the sensor is at the correct position to resume and the scanner can resume processing data.

The control circuit 166 may be configured to generate the step control signal 156 such that the step signal 158 also allows backward movement of the sensor. For example, when pause signal 168 indicates a pause, the control circuit 166 may not immediately stop generation of step control signal 156. Instead, control circuit 166 may be configured to continue generation of step control signal 156 for an amount of time corresponding to the desired number of backward steps, and the step signal 158 includes an indication that backward steps are to be made.

Figure 2:
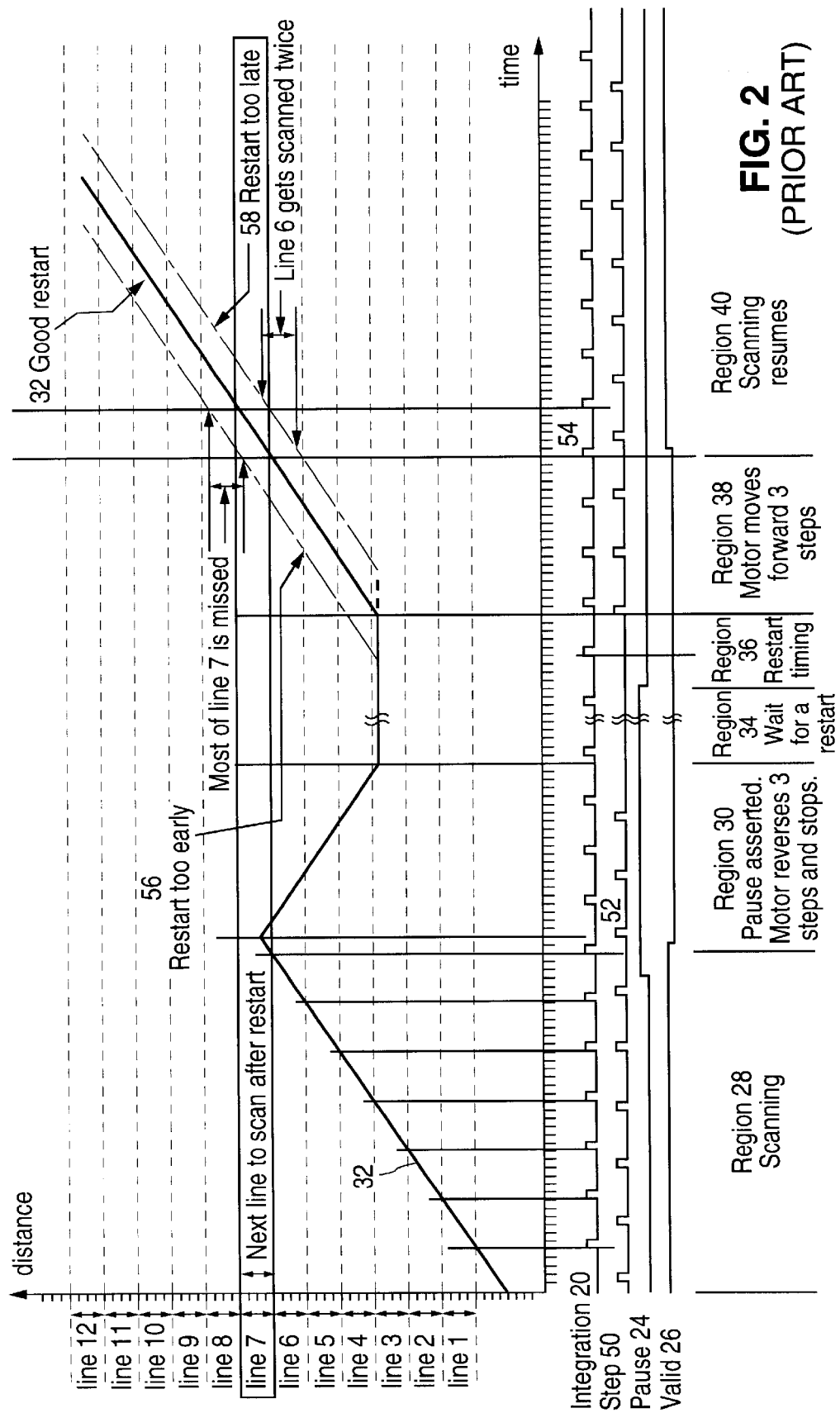
FIG. 2 is a graph of distance in lines scanned versus time by a sensor in another scanner.

For example, as described above regarding FIG. 2, in order to resume scanning at the proper location, the stepper motor should resume stepping at a timing such that, when generation of valid data resumes in region 40 at integration pulse 54, the sensor is at the correct position to sense line seven. This is further illustrated in FIG. 4.

Figure 4:
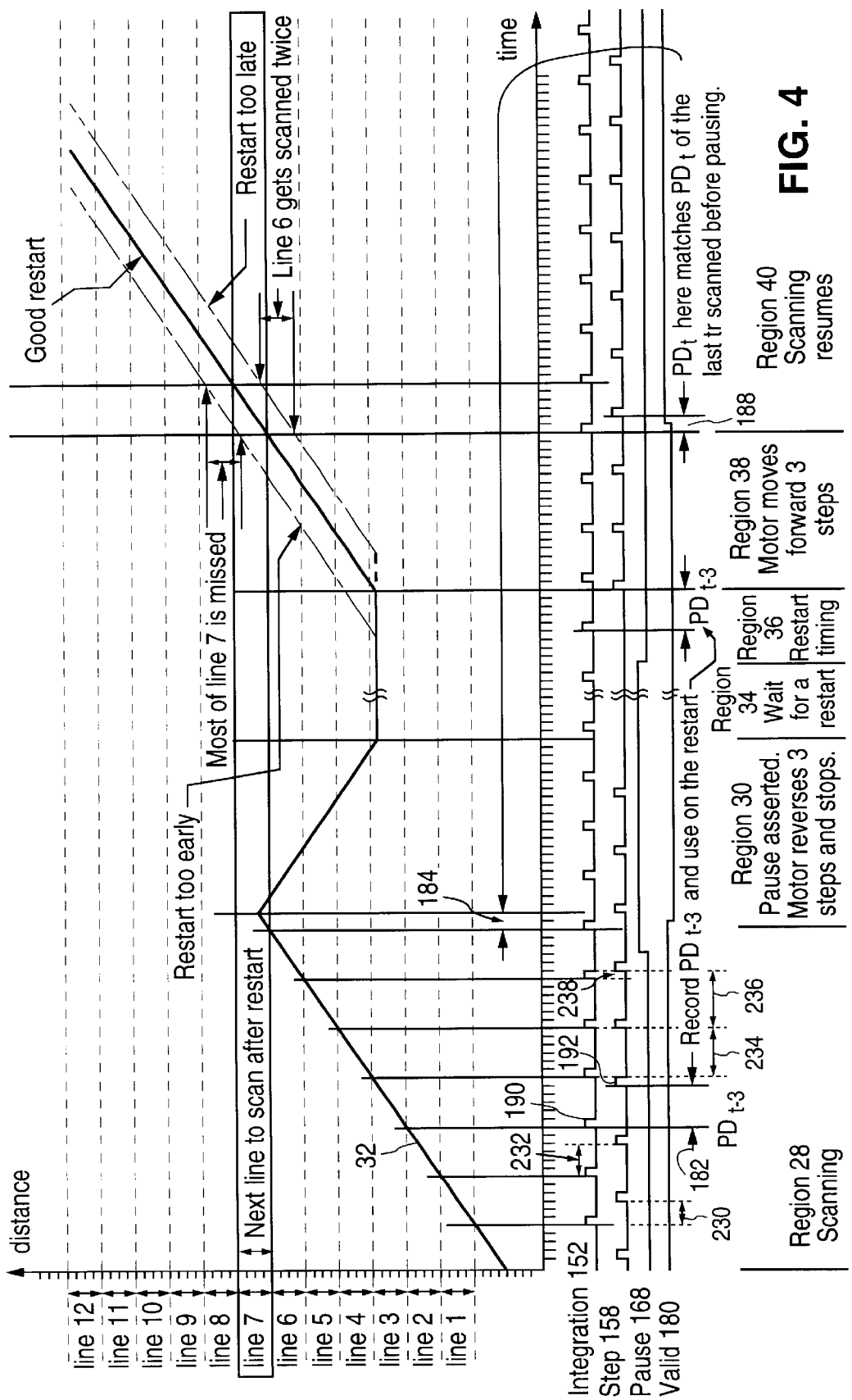
FIG. 4 is a graph of distance in lines scanned versus time by a sensor in a scanner including an embodiment of the present invention.

FIG. 4 illustrates the movement of a sensor in a scanner that includes the circuit of FIG. 3. The x-axis, y-axis, line 32, and regions 28, 30, 34, 36, 38, and 40 are as described above regarding FIG. 2. The step signal 158 has a period slightly longer than that of the integration signal 152; specifically, seven step pulses per eight integration pulses. However, any relationship between these signals may be used. The pause signal 168 indicates that either the buffer is about to be full and the scanner should pause scanning (high in regions 30 and 34), or the buffer is no longer full and the scanner should resume scanning (low in region 36). The data valid signal 180 indicates that either the sensor is over a line that the scanner should not process (low in regions 30, 34, 36, and 38), or the sensor is over a line that the scanner should process (high in region 40).

In region 28, the sensor is moving vertically across lines of the image. The sensor may instead be configured to move horizontally, and the scanner may instead be configured to move the image instead of the sensor. (These choices are not critical to the invention.) Each line is defined by pulses of integration signal 152.

The sensor is moved by the stepper motor, which moves a step every pulse of step signal 158. The stepper motor may instead move a fraction of a step, called a microstep, each step pulse.

The phase difference between a pulse of integration signal 152 and the immediately following pulse of step signal 158 is termed an integration-step phase difference. For example, the integration-step phase difference 182 is the phase difference between integration pulse 190 and step pulse 192.

When scanning the sixth line, the pause signal 168 goes high to indicate that the scanner should pause. After the scanner has finished processing line six, the data valid signal 180 changes to indicate that the scanner is no longer generating valid data. The data valid signal may instead change in the middle of processing the sixth line, but this is not preferred because it may necessitate rescanning line six in its entirety.

In region 30, the integration-step phase difference 184 is the phase difference that should be duplicated at resume for the sensor to continue moving as it was before the pause. Step signal 158 continues for a set number of steps (three in this instance) for the stepper motor to move the sensor backward.

In region 36, pulses of step signal 158 should be restarted at the integration-step phase difference 186 for the sensor to be over the seventh line at the desired time. This occurs when the integration-step phase difference 186 equals the integration-step phase difference 182. Thus, one goal of the present invention is to restart the step signal 158 such that the integration-step phase difference 186 equals the integration-step phase difference 182.

In region 40, scanning resumes at line seven. When the integration-step phase differences 182 and 186 are equal, then the integration-step phase differences 184 and 188 are equal, resulting in the sensor being in the correct position to scan line seven. The present invention makes the integration-step phase differences 182 and 186 equal as follows.

Figure 5:
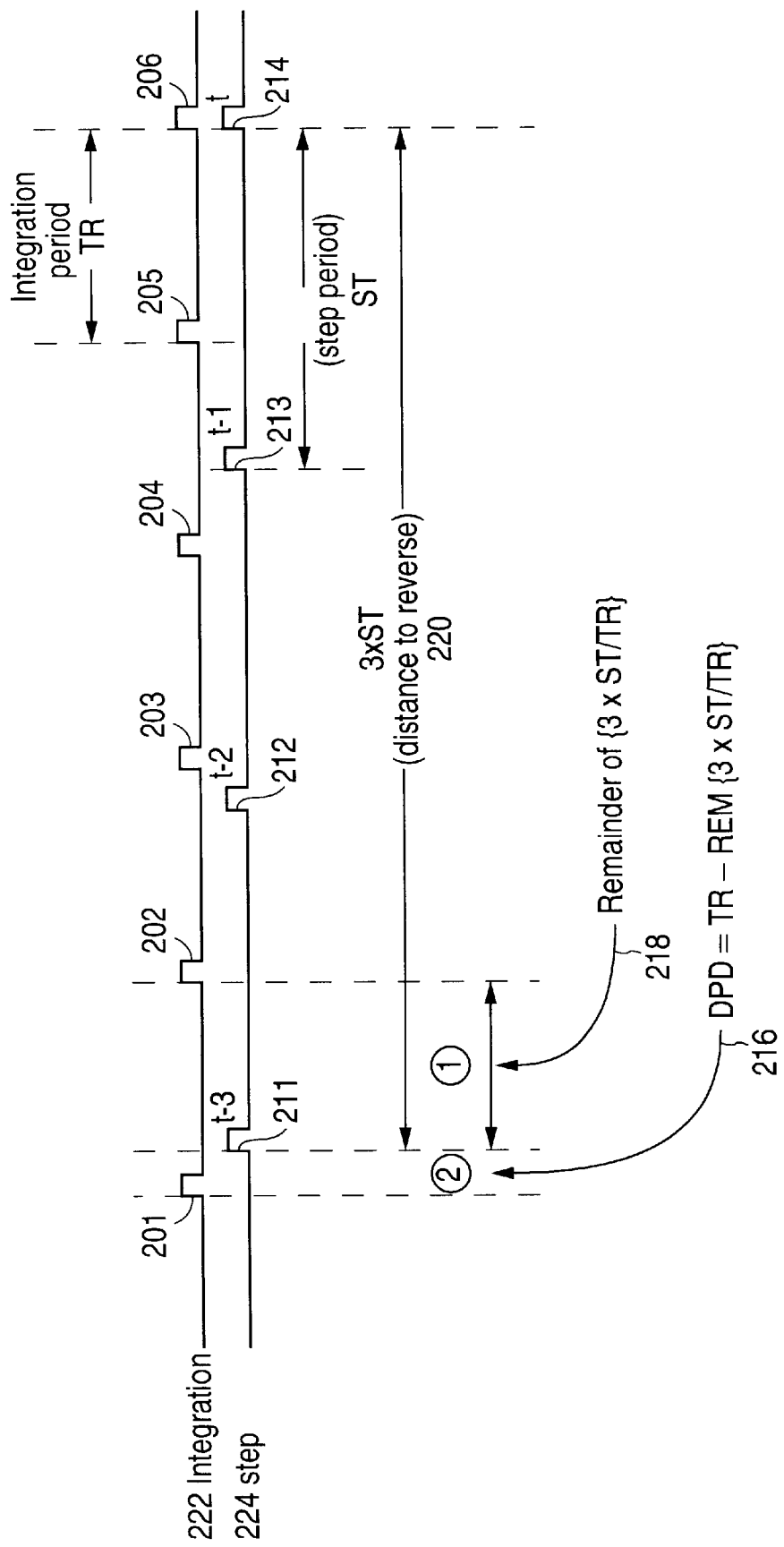
FIG. 5 is a timing diagram of a phase relationship between an integration signal and a step signal in a special case.

FIG. 5 shows a special case of integration signal 222 and step signal 224. Integration signal 222 has six pulses 201–206, and step signal 224 has four pulses 211–214.

Integration pulse 206 is in phase with step pulse 214, giving a present phase difference of zero. The three pulses 211–213 move the sensor forward three steps, just as in region 38 of FIG. 4. Thus, referring back to FIG. 4, the integration-step phase difference 188 is zero for the signals 222 and 224 of FIG. 5. This special case of FIG. 5 allows mathematical calculation of the accurate resumption of step signal 158 at integration-step phase difference 186 in FIG. 4.

In FIG. 5, the integration-step phase difference 216 corresponds to the integration-step phase difference 186, that is, the time after integration pulse 201 that the step signal 224 should be restarted so that the sensor is in the correct position to resume scanning. The phase difference 216 is also called the default phase difference. Reversing three steps results in distance 220, that is, three times the step period. Phase difference 218 is the remainder of the distance 220 divided by the integration period, that is, the remainder of the number of reversed steps times the step period divided by the integration period. Thus, the default phase difference 216 is the integration period minus the phase difference 218, that is, the integration period minus the remainder of the number of reversed steps times the step period divided by the integration period. Or as an equation, $$DPD = IntergrationPeriod - Rem\left(\frac{N \cdot StepPeriod}{IntergrationPeriod}\right)$$

where N is the number of steps that were made in the reversal.

Thus, for the special case, the timing of the resumption of the step signal can be calculated based on quantities known at the beginning of a scan.

FIGS. 6A, 6B, and 6C show how the special case of FIG. 5 may be generalized to other phase differences. FIG. 6A repeats FIG. 5, showing integration signal 222, step signal 224, default phase difference 216, and a present phase difference of zero.

FIG. 6B returns to the general case of FIG. 4 in region 28, showing integration signal 152, step signal 158, pause signal 168, data valid signal 180, and integration-step phase difference 184. Phase difference 184 is also called the present phase difference because it is the integration-step phase difference that precedes the pause signal 168 changing from low to high. The scanner continues processing the line defined by integration pulses 207 and 209 after the pause signal 168 changes in order to avoid the possible need to rescan that line in its entirety. Then, the data valid signal 180 goes low to indicate that the scanner should stop processing.

Step pulse 223 then begins the backward steps. In order to resume processing at the correct line, the scanner counts the two integration pulses 207 and 209 after the step pulse 221 (the present phase difference pulse) and stores this count value.

FIG. 6C corresponds to regions 36, 38, and 40 in FIG. 4. After pause signal 168 changes, at the next pulse of the integration signal 152, the scanner waits for present phase difference 184 and default phase difference 216 before resuming step clock signal 158. (The scanner may wait for a different period, but beginning the wait at the next integration pulse after the pause signal changes is efficient.) The sum of phase differences 184 and 216 is the same as phase difference 186. Then, integration-step phase difference 188 equals present phase difference 184, and the sensor is in the correct position.

This can be seen from a comparison of FIGS. 6A, 6B, and 6C. In FIG. 6A, a scanner would only have to wait for the default phase difference 216 to pass before resuming the step signal 224 after a pause. The present phase difference is zero. In FIG. 6B, the additional delay of the present phase difference 184 correspondingly shifts the step signal 158. So in FIG. 6C, a scanner must wait for both the default phase difference 216 and the present phase difference 184 before resuming the step signal 158. Finally, the scanner counts integration pulses 207 and 209 after the step pulse 225 in order to change the data valid signal 180 for the scanner to resume processing. (Note that the numerals 207 and 209 in FIGS. 6B and 6C refer to the same integration pulses in that they define the same line to process. They do not refer to the same temporal integration pulses, because the pulses in FIG. 6C occur after the reverse steps, pause, and forward steps, which all begin after the pulses in FIG. 6B.)

Counting the integration pulses 207 and 209 after the step pulse 221 allows an efficient resume when more than one integration pulse occur in a step period. Another option would be to resume processing on the first integration pulse 207 after the step pulse 225 and discard any duplicate data.

FIG. 7A shows a preferred embodiment of the phase difference storage circuit 164 (see FIG. 3). Preferably the storage circuit 164 is configured to store two phase difference values. The first phase difference value corresponds to the default phase difference. The second phase difference value corresponds to the present phase difference. The control circuit 166 reads the first phase difference value, and then the control circuit counts down to zero. The control circuit 166 then reads the second phase difference value, and then the control circuit counts down to zero. In this manner the proper resume timing is met, as seen in FIG. 6C.

The control circuit 166 is configured to read the present phase difference when the pause signal 168 changes and to load it as the second phase difference value. The default phase difference value is preferably calculated by the computer before the scan begins because the number of steps to reverse, the integration period, and the step period are all known at that time. The circuit of FIG. 7A is preferred because it implements the proper delay with a very small storage capacity.

FIG. 7B shows another embodiment of phase difference storage circuit 164, denoted 164b. Storage circuit 164b stores a plurality (e.g., N+1) of phase difference values. The plurality of phase difference values correspond to as many previous present phase differences as the maximum number of steps backward the scanner may be configured to take (N), plus one. For example, referring to FIG. 4 where N=3, when the scan starts at line 1, phase difference 230 is the present phase difference, and storage circuit 164b stores {230, <null>, <null>, <null>}. At the next line, phase difference 232 is the present phase difference, and storage circuit 164b stores {232, 230, <null>, <null>}. At line three, phase difference 182 is the present phase difference, and storage circuit 164b stores {182, 232, 230, <null>}. At line four, phase difference 234 is the present phase difference, and storage circuit 164b stores {234, 182, 232, 230}. At line five, phase difference 236 is the present phase difference, and storage circuit 164b stores {236, 234, 182, 232}. The value for phase difference 230 is no longer needed because the scanner will not reverse that far. A nonzero phase difference 236 was chosen to allow processing time, but a zero value may be used if desired. At line six, phase difference 238 is the present phase difference, and storage circuit 164b stores {238, 236, 234, 182}.

Then, pause signal 168 changes. The control circuit 166 loads the appropriate phase value, in this case the phase difference 182, as the count value. The circuit of FIG. 7B is less preferred because it uses more storage capacity.

FIG. 8 shows more detail of control circuit 166 (see FIG. 3), including a counter circuit 240 and a subcontrol circuit 242. The counter circuit 240 is configured to receive the processor clock signal 162, a resume signal 246, and the phase difference value. The counter circuit 240 is configured to count pulses of the processor clock signal 162 after receiving the resume signal 246, and to generate a counter signal 244 when a pulse count equals the phase difference value.

The subcontrol circuit 242 is configured to receive the pause signal 168, the integration signal 152, and the counter signal 244. The pause signal 168 has two states. The subcontrol circuit 242 is configured to selectively generate the step control signal 156 such that the step control signal 156 is paused after receiving the pause signal 168 in a first state, to generate the resume signal after receiving a pulse of the integration signal 152 and the pause signal 168 in a second state, and to selectively generate the step control signal 156 such that the step control signal 156 is resumed after receiving the counter signal 244.

More specifically, with reference to FIGS. 4 and 8, in region 28 the pause signal 168 changes from low to high. The counter circuit 240 receives the integration-step phase difference 184. The subcontrol circuit 242 continues generation of the step control signal 156 for an amount of time corresponding to the three backward pulses in region 30. In region 34, the pause signal 168 changes from high to low. In region 36, the subcontrol circuit 242 receives a pulse of the integration signal 152 and generates the resume signal 246. Counter circuit 240 counts the integration-step phase difference 184 down to zero, then loads the default phase difference value, then counts the default phase difference value down to zero, and then generates the counter signal 244. In region 38, the subcontrol circuit 242 receives the counter signal 244 and resumes generation of the step control signal 156.

Of course, instead of first counting down the integration-step phase difference 184 and then counting down the default phase difference value, this may be done in reverse order. In addition, when operating with the circuit of FIG. 7B, only one integration-step phase difference needs to be counted.

In addition, the subcontrol circuit 242 selectively generates the data valid signal 180. More specifically, with reference to FIG. 6B, the subcontrol circuit 242 counts the integration pulses that occur after each pulse of the step signal 158. After the pause signal 168 indicates a pause, the subcontrol circuit 242 stores the value of the pulse count at the next integration pulse. The scanner continues processing pixels until the next integration pulse, at which time the subcontrol circuit 242 also causes the data valid signal 180 to go low. The scanner can then step backwards and pause.

For example, each pulse of the step signal 158 resets the count. At step pulse 221, the first integration pulse counted is 207. The pause signal 168 then goes high. The second pulse counted is 209, and the value of two is stored.

Then, with reference to FIG. 6C, the pause signal 168 goes low and the control circuit 166 begins the resume process. At step pulse 225 the sensor is in the correct position to resume scanning. (One way for the control circuit 166 to detect the correct resume position is to count step pulses.) The subcontrol circuit 242 then counts the next integration pulses (207 and 209) until this count matches the stored count value (two), at which point the subcontrol circuit 242 causes the data valid signal 180 to go high. FIG. 9 is a block diagram of a computer 252 and a scanner 250 including the circuit of FIG. 3. The computer 252 is configured to run a computer program 254. The computer program 254 computes the phase difference value. The scanner 250 scans an image and sends the data to the computer 252. The computer 252 sends various control signals to the scanner 250.

FIG. 10 is block diagram of the computer program 254. The phase difference calculation subroutine 256 preferably calculates the default phase difference as described above. The interface subroutine 258 communicates the default phase difference to the computer 252 and the scanner 250. As described above, because this calculation is based upon information known before a scan starts, the default phase difference may be provided to the scanner 250 at that time.

The computer program 254 may be configured to store a table of integration-step phase difference values like the circuit of FIG. 7B. In such a configuration the interface subroutine 258 may be configured to communicate the integration-step phase difference value to the scanner 250 in the middle of a scan after a pause, instead of before the scan. This configuration is less preferred because it involves interrupting the data transfer from the scanner 250 to the computer 252.

The computer program 254 may include other subroutines for controlling other aspects of the computer 252 and the scanner 250.

Figure 11:
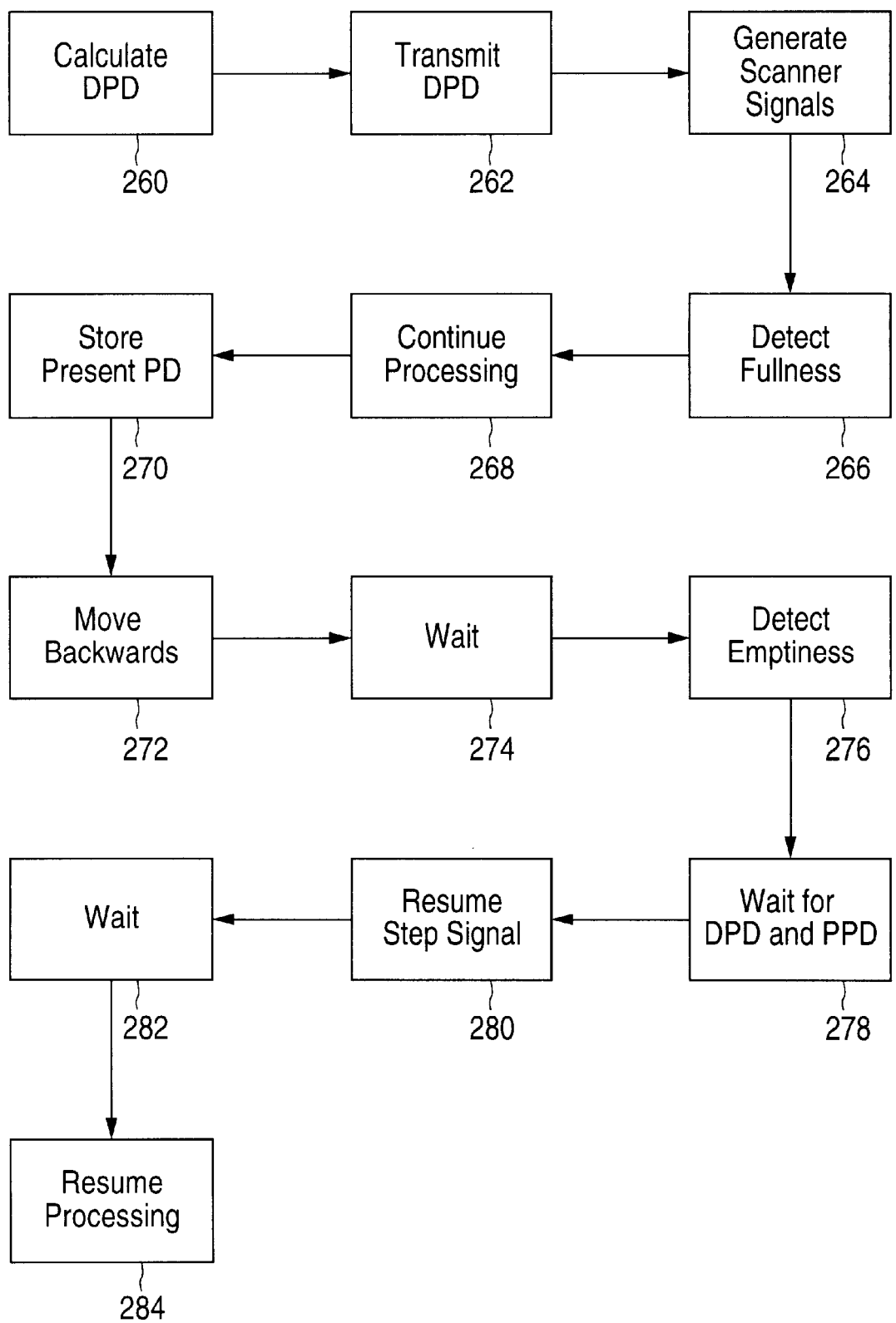
FIG. 11 is a block diagram of a method according to an embodiment of the present invention.

FIG. 11 is a block diagram of the preferred method steps according to the present invention. In step 260, the computer program 254 calculates the default phase difference as described above, using the number of backward steps, the integration period, and the step period. The basic default phase difference equation may be modified depending on the specific scanner features. For example, the acceleration profile of the stepper motor may be more closely modeled; the equation may account for color pixel processing or an additional dummy amount of pixels per line; the scanner may have faster modes of operation for rough scanning; or other features may be added that affect the step period and the integration period.

In step 262, the computer program transmits the default phase difference to the scanner hardware (see FIG. 9).

In step 264, the scanner hardware generates the integration signal 152 and the step signal 158. The scanner is now scanning an image.

In step 266, the scanner hardware detects that the buffer is approaching its capacity and generates the pause signal 168. The capacity threshold may be set at any suitable value, including completely full.

In step 268, the scanner hardware continues processing the current line. As described above, this simplifies resumptions because the sensor does not have to be in the same exact position within a line. This also allows the sensor to continue its movement. In addition, this may be more efficient because if the scan is not resumed at the same exact position within a line, the scan quality may decrease unless the entire line is re-scanned.

In step 270, the scanner has completed scanning the line and stores a present integration-step phase difference 184 between the integration pulse that ended the current line and the next step pulse (see region 30 in FIG. 4). The scanner also stores a count of integration pulses after a step pulse so that the data valid signal may indicate the proper line on which to resume processing.

In step 272, the scanner hardware continues generating the step signal 158 for a desired amount of time, but the stepper motor moves the sensor in a backward direction for N steps.

In step 274, the scanner hardware waits for the buffer to empty.

In step 276, the scanner hardware detects that the buffer is approaching empty and changes the pause signal 168 to so indicate. The empty threshold may be set at any suitable value, including completely empty. Ideally, the empty threshold is set such that the buffer is totally empty when data for the new line is starting to be generated.

In step 278, at the first integration pulse after the pause signal 168 has changed in step 276, the scanner hardware waits for a time period 186 corresponding to the default phase difference and the present integration-step phase difference 184 (see region 36 in FIG. 4).

Alternatively, as described above with reference to FIG. 7B, a less preferred method involves storing a plurality of integration-step phase differences and then waiting for a time period corresponding to one of the previous integration-step phase differences.

In step 280, after waiting in step 278, the scanner hardware resumes the step signal 158. The sensor will then be in the correct position at the correct time to continue scanning the image.

In step 282, the scanner waits for N step pulses and then waits for the correct integration pulse, as described above with reference to FIGS. 6B and 6C and the accompanying text.

In step 284, the scanner resumes processing data from the sensor.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. A method of controlling a scanner configured to scan an image with a sensor, comprising the steps of:
   monitoring an integration signal having an integration period in which a line of an image is scanned and a step signal having a step period in which a step of relative movement between said image and a sensor is performed, wherein a phase difference is a comparative characteristic between said step signal and said integration signal; and
   calculating at least one phase difference value based on said phase difference between said integration signal and said step signal.

2. The method of claim 1, wherein said step of calculating comprises:
   calculating, when a first integration pulse related to said integration period and a first step pulse related to said step period have a phase difference of zero, a first phase difference value based on a phase difference between a previous step pulse and a previous integration pulse that immediately precedes said previous step pulse; and
   calculating a second phase difference value based on a phase difference between a second step pulse and a second integration pulse that immediately precedes said second step pulse.

3. The method of claim 1, further comprising the steps of:
   generating said integration signal;
   generating said step signal;
   receiving a pause signal;
   pausing generation of said step signal after receipt of said pause signal; and
   resuming generation of said step signal in accordance with said integration signal, said step signal, and said at least one phase difference value.

4. The method of claim 3, further comprising the steps of:
   moving said sensor relatively backward over a number of lines of said image, before said step of pausing; and
   moving said sensor relatively forward, after said step of resuming.

5. A computer program embodied on a computer-readable medium for controlling a scanner configured to scan an image with a sensor, comprising:
   a computer-readable medium; and
   a phase difference calculation subroutine, embodied on said computer-readable medium, configured to calculate at least one phase difference value based on a phase difference between an integration signal having an integration period in which a sensor scans a line of an image and a step signal having a step period in which a step of relative movement between said image and said sensor is performed.

6. The computer program of claim 5, wherein:
   said phase difference calculation subroutine is further configured to calculate at least a first phase difference value based on a difference between said integration period and a remainder of one or more step periods divided by said integration period.

7. The computer program of claim 6, wherein:
   said one or more step periods correspond to one or more steps in a backward direction that said sensor is configured to take.

8. The computer program of claim 5, further comprising:
   an interface subroutine configured to enable said phase difference value to be transmitted to a scanner.

9. An apparatus including a circuit for controlling a scanner configured to scan an image with a sensor by relative movement therebetween in units of steps, said circuit comprising:
   a phase difference storage circuit configured to store at least one phase difference value based on a phase difference between an integration signal having an integration period in which a line of an image is scanned and a step signal having a step period in which a step of relative movement between said image and a sensor is performed; and
   a control circuit, coupled to said phase difference storage circuit, configured to receive a pause signal, said integration signal, a processor clock signal, and said phase difference value, and in accordance therewith to generate a step control signal.

10. The apparatus of claim 9, wherein said circuit further comprises:
   an integration signal generator circuit, coupled to said control circuit, configured to generate said integration signal;
   a step signal generator circuit, coupled to said control circuit, configured to receive said step control signal and in accordance therewith to selectively generate said step signal; and
   a processor clock signal generator circuit, coupled to said control circuit, configured to generate said processor clock signal having a period less than said integration period and less than said step period.

11. The apparatus of claim 9, wherein said pause signal has a first state and a second state, wherein said control circuit comprises:
   a counter circuit configured to receive said processor clock signal, a resume signal, and said at least one phase difference value, and in accordance therewith to count pulses of said processor clock signal and to generate a counter signal when a pulse count equals one of said at least one phase difference value; and a subcontrol circuit, coupled to said counter circuit, configured to receive said pause signal, said integration signal, and said counter signal, and in accordance therewith to pause generation of said step control signal after receiving said pause signal in said first state, to generate said resume signal after receiving said pause signal in said second state and a pulse of said integration signal, and to resume generation of said step control signal after receiving said counter signal.

12. The apparatus of claim 9, wherein:

said phase difference storage circuit is configured to receive at least one first phase difference value and in accordance therewith to store said at least one first phase difference value, and to receive at least one second phase difference value and in accordance therewith to store said at least one second phase difference value;

said control circuit is further configured to generate said at least one second phase difference value based on a phase difference between a first step pulse of said step signal and a first integration pulse of said integration signal that immediately precedes said current step pulse; and said control circuit is further configured to generate said step control signal based on one of said at least one first phase difference value and one of said at least one second phase difference value.

13. The apparatus of claim 12, wherein:

said phase difference storage circuit is further configured to receive said at least one first phase difference value from an associated computer.

14. The apparatus of claim 9, wherein:

said phase difference storage circuit is configured to receive a plurality of phase difference values and in accordance therewith to store said plurality of phase difference values;

said control circuit is further configured to generate each of said plurality of phase difference values based on a phase difference between a current step pulse of said step signal and a current integration pulse of said integration signal that immediately precedes said current step pulse; and said control circuit is further configured to generate said step control signal based on one of said plurality of phase difference values.

15. The apparatus of claim 9, wherein said apparatus further includes:

a scanner incorporating said circuit.

* * * * *

UNITED STATES PATENT AND TRADEMARK OFFICE
CERTIFICATE OF CORRECTION

PATENT NO.    : 6,369,918 B1  
DATED         : April 9, 2002  
INVENTOR(S)   : Tom et al.

It is certified that error appears in the above-identified patent and that said Letters Patent is hereby corrected as shown below:

<u>Title page,</u>
Item [56], References Cited, U.S. PATENT DOCUMENTS, delete "4,782,840 A, 11/ 1998, Martin, Jr. et al....., 414/4.49" and "5,716,595 A, 2/1998, Goldenberg...., 128/654".

Signed and Sealed this

Twenty-ninth Day of October, 2002

Attest:

Attesting Officer

JAMES E. ROGAN  
Director of the United States Patent and Trademark Office